US United States Patent Office 3,833,666
Patented Sept. 3, 1974

3,833,666
PROCESS FOR BROMOMETHYLATING
AROMATIC HYDROCARBONS
Herbert Jenkner, Cologne, Germany, assignor to
Chemische Fabrik Kalk GmbH
No Drawing. Filed May 7, 1971, Ser. No. 141,410
Claims priority, application Germany, June 3, 1970,
P 20 27 162.9
Int. Cl. C07c 41/00, 43/20
U.S. Cl. 260—612 R            9 Claims

ABSTRACT OF THE DISCLOSURE

Bromomethylation of an aromatic hydrocarbon by the reaction of an aromatic hydrocarbon with formaldehyde or paraformaldehyde and an aliphatic carbonic acid with a solution of hydrogen bromide in an aliphatic carbonic acid.

Background of the Invention

Bromoalkylbenzenes can be produced from alkylbenzenes, the side chains of which are brominated. Such bromination processes, however, have been found to be unselective, particularly in the case of higher molecular weight polyalkylbenzenes in which case such processes lead to mixtures containing aromatically bonded bromine in addition to aliphatically bonded bromine. To some extent the methyl groups contain more than one bromine atom while others are not brominated.

It is difficult to separate these mixtures into the individual components. The impure mixtures, however, are not suitable for most purposes.

It has therefore been attempted, for example, to obtain bromomethylbenzenes by bromomethylating methylbenzenes at 80° C., using glacial acetic acid, paraformaldehyde, sodium bromide and concentrated sulphuric acid. This process, too, led to unsatisfactory results, especially when p-zylene was used as starting material.

In the "Berichten der deutschen Chemischen Gesellschaft 1934, 1094–1099" authors von Braun and Nelles describe a chloromethylating process, according to which p-xylene, with a fivefold amount of concentrated hydrochloric acid and the same amount of formaldehyde are chloromethylated by adding additional HCl gas at 60 to 70° C. to form monochloromethyl- and bis-(chloromethyl)-dimethylbenzene. The authors did not seem to think that it was feasible to effect the corresponding conversion with HBr since they produced the bis-(bromomethyl)-dimethylbenzene by conversion of the corresponding chlorine compound with fuming HBr.

According to U.S. Pat. 3,168,580, tris-(halogenmethyl)-trimetheylbenzenes are obtained by the conversion of trimethylbenzene with formaldehyde or its polymer form and excess HCl or HBr in an autoclave at 20 to 100 atmospheres. Tris-(halogenmethyl)-trimethylbenzene (14%) and the corresponding bis-(halogenmethyl)-compound (52.5%) are formed, the latter being converted to the tris-compound by a second pressure treatment. This process, carried out under pressure and in two stages, is costly in view of the equipment required.

Therefore, a process was sought which would permit high yields of bromoalkylbenzenes by bromomethylation under normal pressure (atmospheric pressure) and in the absence of a catalyst.

Summary of Invention

It has now been found that hydrocarbons can be bromomethylated by conversion of these hydrocarbons with formaldehyde or paraformaldehyde and a bromide compound in the presence of an acid. This process is characterized by mixing of the hydrocarbon with the formaldehyde and an aliphatic carbonic acid containing 2 to 6 carbon atoms inclusive in the molecule, and adding to this mixture a solution of hydrogen bromide, preferably in an additional amount of an aliphatic carbonic acid, under normal pressure and at a temperature from about 20 to 120° C. preferably about 60 to 90° C. The reaction mixture is then cooled and the reaction product separated from the mother-liquor, washed and dried.

Description of the Preferred Embodiment

According to the invention, the hydrocarbon used as starting material is conveniently introduced into a reaction vessel which can be heated and which is equipped with a stirring device.

Depending upon the final product to be produced, the following can be used as starting materials: benzene, toluene, p-xylene, mesitylene, durene, diphenyl, diphenylether, 1-4-diethyl-2,5-diisopropylbenzene, 4-4'-dibromodiphenyl, ethylbenzene, p-bromoanisol, etc. Also, such hydrocarbons having several non-condensed benzene nuclei in the molecule are regarded as hydrocarbons. A 0.7 to 0.9 fold amount by weight of paraformaldehyde and the 1 to 6 fold amount by weight of a carbonic acid are added to the starting material. Any lower molecular weight fatty acid such as, for instance, acetic acid, propionic acid, butyric acid, bromoacetic acid and diethyl-acetic acid, are particularly suitable for use as the carbonic acid employed. The use of acetic acid is particularly advantageous.

After the mixture consisting of the hydrocarbon, paraformaldehyde, and carbonic acid has reached a temperature from about 20 to 120° C., preferably about 60 to 90° C., hydrogen bromide, preferably dissolved in a lower molecular aliphatic carbonic acid (alkanoic acid), especially in the same carbonic acid already present in the reaction mixture, is added to the mixture over a period of 3 to 5 hours with continuous stirring. During the reaction, the temperature of the reaction mixture is maintained between about 20 and 120° C., preferably between about 60 and 90° C. The concentration of hydrogen bromide in this reaction mixture is not critical. It was found to be advisable, however, to use hydrogen bromide in a concentration of about 5 to 45% by weight, preferably between about 30 and 36% by weight. The quantity of hydrogen bromide solution should be such that about 120 to 170% of the amount of hydrogen bromide theoretically required is fed into the reaction mixture. After the required amount of HBr has been introduced into the reaction, the reaction mixture is usually allowed to stand for about one to three hours to complete the reaction; the stirring being continued during that time. The contents of the reaction vessel are then cooled, during which the final product usually crystallizes. A vacuum pump or centrifuge etc., is usually used to separate the crystals from the mother liquor. The crystals are then washed until the wash liquid is neutral and is then dried in a vacuum. Depending on the type of starting material and final product, yields from 80 to 97% of theory are obtained. The final products are obtained virtually free from isomeric compounds, their purity being sufficient for known purposes. The yield can be substantially increased without affecting the purity of the final product, if the mother-liquor, formed during separation of the final product, is used as solvent for the hydrogen bromide needed for the next batch. Yields from 85 to 100% of theory can be obtained in this manner.

Although a solvent is not required for the reaction, one may frequently be utilized to advantage if desired.

The following Examples are given to illustrate the process of the invention.

Example 1 p-Xylene, 106 parts by weight, 90 parts by weight of paraformaldehyde, and 200 parts by weight of glacial acetic acid are introduced into a reaction vessel and heated to a temperature of 80° C., with continuous stirring. A solution of hydrogen bromide in glacial acetic acid, 810 parts by weight containing 33% by weight HBr, are added to the mixture over a period of five hours. The temperature of the reaction mixture is then increased to 90° C. and is left at this temperature for an additional 3 hours, stirring being continued during that time. At the end of this period, the reaction mixture is cooled to 20° C. The final product is separated from the mother-liquor by vacuum filtration, washed with water until the wash liquid shows a neutral reaction, and then dried under vacuum. The yield obtained consists of 234 parts by weight (80% of theory) of 2,5-bis-(bromomethyl)-dimethylbenzene. If the mother-liquor is used as solvent for the hydrogen bromide to be added to a further batch consisting of the same starting materials and quantities, the yield will then be 248 parts by weight or 85% of theory relative to p-xylene.

Example 2

Mesitylene, 120 parts by weight, 105 parts by weight of paraformaldehyde, and 400 parts by weight of glacial acetic acid are mixed together in a reaction vessel as in Example 1 and are heated to a temperature of 90° C. Once the reaction temperature has been reached, 933 parts by weight of a solution of hydrogen bromide in glacial acetic acid containing 33% by weight of HBr are added over a period of five hours. The reaction mixture is stirred for an additional two hours at a temperature of 85° C. The reaction product is separated by cooling the reaction mixture to a temperature of 15° C, washed until neutral (after it was separated) and dried. A total of 332 parts by weight or 83% of theory of 1,3,5-tris-(bromomethyl)-trimethylbenzene is obtained. By using the mother-liquor as solvent for the hydrogen bromide in a subsequent run, the yield is increased to 382 parts by weight or 95.7% of theory.

Example 3

In the same manner as described in Example 1, 134 parts by weight of durene, 97 parts by weight of paraformaldehyde and 380 parts by weight of glacial acetic acid are reacted with 628 parts by weight of a 36% solution of hydrogen bromide in glacial acetic acid to yield 311 parts by weight (97.2% of theory) of 1,4-bis-(bromomethyl)-tetramethylbenzene. If the mother-liquor is used as a solvent for the hydrogen bromide in a subsequent run, the yield is increased to 320 parts by weight or 100% of theory.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which reside in the present invention including all features which would be treated as equivalents thereof by those skilled in the art to which the invention pertains.

What is claimed is:

1. A process for producing bromomethylated aromatic compounds comprising (a) mixing together in the absence of a catalyst an aromatic compound selected from the group consisting of benzene, toluene, p-xylene, mesitylene, durene, diphenyl, diphenylether, 1-4,diethyl-2,5-diisopropylbenzene, 4,4'-dibromodiphenyl, ethyl benzene and p-bromoanisol 0.7 to 0.9 parts by weight paraformaldehyde to 1 part by weight of said aromatic compound and an acid selected from the group consisting of an alkanoic acid having 2 to 6 carbon atoms inclusive and bromoacetic acid; (b) adding to said mixture a solution of hydrogen bromide in said acid, as previously defined, at atmospheric pressure and at a temperature in the range of about 20° to 120° C.; (c) cooling the reaction mixture; and, (d) separating the reaction product.

2. A process in accord with Claim 1 in which the hydrogen bromide concentration in the solution is about 5 to 45% by weight.

3. A process in accord with Claim 2 in which the hydrogen bromide concentration is about 30 to 36% by weight.

4. A process in accord with Claim 1 in which said acid is acetic acid.

5. A process in accord with Claim 1 in which said acid is propionic acid.

6. A process in accord with Claim 2 in which said acid is acetic acid.

7. A process in accord with Claim 2 in which said acid is propionic acid.

8. A process in accord with Claim 1 in which the same acid is used in steps (a) and (b).

9. A process for bromomethylating compounds, in accord with Claim 1 in which a solution of hydrogen bromide and recycled mother-liquor from previous run is added to the mixture of said aromatic compound, said paraformaldehyde and said acid.

References Cited

UNITED STATES PATENTS

| | | | |
|---|---|---|---|
| 3,069,480 | 12/1962 | Hirth | 260—651 HA |
| 2,525,779 | 10/1950 | Benneville | 260—651 HA |
| 2,951,100 | 8/1960 | Adams et al. | 260—651 HA |
| 3,168,580 | 2/1965 | Adams | 260—651 HA |
| 3,577,476 | 5/1971 | Gurney et al. | 260—651 HA |
| 3,076,039 | 1/1963 | Ayers et al. | 260—649 R |
| 3,271,465 | 9/1966 | Krewer et al. | 260—649 R |
| 3,068,298 | 12/1962 | Huffman | 260—649 R X |

HOWARD T. MARS, Primary Examiner

U.S. Cl. X.R.

260—612 D, 649 R, 649 D, 651 HA